United States Patent [19]

Takimoto

[11] Patent Number: 4,774,577
[45] Date of Patent: Sep. 27, 1988

[54] ANALOG-TO-DIGITAL CONVERSION APPARATUS FOR VIDEO SIGNAL

[75] Inventor: Hideki Takimoto, Tokyo, Japan

[73] Assignee: NEC Corporation, Japan

[21] Appl. No.: 909,786

[22] Filed: Sep. 19, 1986

[30] Foreign Application Priority Data

Sep. 20, 1985 [JP] Japan .................................. 60-209458

[51] Int. Cl.[4] ........................ H04N 7/13; H04N 5/04
[52] U.S. Cl. ..................................... 358/148; 358/13; 358/141; 358/158; 341/155
[58] Field of Search ............... 358/148, 149, 153, 158, 358/150, 12, 13, 141; 340/347 AD, 347 DD

[56] References Cited

U.S. PATENT DOCUMENTS 4,647,968  3/1987  Willis ................................... 358/141
4,672,447  6/1987  Möring et al. ...................... 358/158

Primary Examiner—James J. Groody
Assistant Examiner—Michael D. Parker
Attorney, Agent, or Firm—Ostrolenk, Faber, Gerb & Soffen

[57] ABSTRACT

An analog-to-digital conversion circuit for converting an input analog video signal to a digital video signal includes a sync separator for deriving from the analog video signal a horizontal synchronizing signal, and a voltage controlled oscillator (VCO) for producing a clock signal. An A/D converter converts the input analog signal to digital video based on the timing of the clock signal. The VCO, which produces the clock signal, is controlled by a circuit which compares the phase of the horizontal synchronizing signal extracted from the digital video signal to the phase of the clock signal. The clock signal is therefore highly stable and free of any adverse effects generated by drifts of the synchronizing signal separator and adverse effects produced by a lowpass filter employed in the circuit.

10 Claims, 2 Drawing Sheets

ANALOG-TO-DIGITAL CONVERSION APPARATUS FOR VIDEO SIGNAL

BACKGROUND OF THE INVENTION

This invention relates generally to a video analog-to-digital conversion (hereinafter referred to as the video "A/D converter" or alternately as the "A/D conversion circuit) circuit, and more particularly to a circuit for generating a clock signal which is synchronized to a digital video signal produced by the A/D converter.

In conventional video A/D converters designed for handling a video signal, a synchronizing signal is extracted from an input analog video signal by a synchronizing signal separator circuit. A clock signal is generated by a phase locked loop on the basis of the separated synchronizing signal. In other words, the video A/D converter contains, in addition to a conventional A/D converter, a voltage control oscillator (VCO) for generating the clock signal, a counter for frequency-dividing the clock signal to generate a frequency divided output signal having a frequency equal to that of the synchronizing signal and a phase comparator for comparing the phase of the frequency division output signal from the counter to the output of the separated synchronizing signal to provide a control voltage for the VCO. The clock signal from the VCO is supplied to the A/D converter which provides a digital (PCM) video signal output. The video A/D converter also includes a lowpass filter for preventing folded noise, the filter being located as a pre-stage circuit of the A/D converter.

The synchronizing signal in the synchronizing signal separator is obtained by a clipper (comparator) after frequency band limitation is made by a lowpass filter in order to remove any erroneous components, i.e., a chrominance component and a noise component contained in the video signal. Consequently and due to the lowpass filter, a drift is generated and since the lowpass filter is disposed before the A/D converter, a drift or fixed delay also occurs. Further, the A/D converter itself produces variations in conversion time. Therefore, synchronisation between the synchronizing signal in the digital video signal and the clock signal supplied to the A/D converter for effecting quantitization is inaccurate. The phase difference therebetween sometimes may reach as much as a full clock period.

If the abovementioned clock signal is then used to produce a control signal for mixing, for example, plural digital video signals in a digital video system where all video signals are processed in digital form, the phase difference between the synchronizing signal contained in the digital video signal and the clock signal causes a delicate time lag in a mixed video signal. In the worst case, horizontal blanking appears in the active video portion when a plurality of digital video processing equipment are connected in series in the digital video system.

SUMMARY OF THE INVENTION

It is therefore a primary object of the present invention to provide a video A/D converter circuit which can generate a clock signal which is accurately synchronized to a synchronizing signal contained in the digitised video signal.

In accordance with the present invention, there is provided an A/D conversion circuit which comprises an A/D converter for quantizing an input analog video signal to obtain a digital video signal, means for separating a horizontal synchronizing pulse from the input analog video signal and outputting it as a first horizontal synchronizing signal, a voltage control oscillator (VCO) for generating a clock signal, a frequency divider for counting down the clock signal to generate a second horizontal synchronizing signal, means for obtaining first data representing a substantially intermediate value of the amplitude of the tip of the horizontal synchronizing signal contained in the digital video signal by use of the first horizontal synchronizing signal, means for obtaining second data by sampling the digital video signal at the timing of the second horizontal synchronizing signal, means for obtaining third data corresponding to a difference between the first and second data, and means for feeding back the third data as a control voltage to the VCO.

In the present invention, the phase-locked loop is formed by using the phase of the horizontal synchronizing signal contained in the digital video signal, and any adverse influences of the drifts of the synchronizing signal separator and the folded noise prevention lowpass filter can be removed.

DESCRIPTION OF THE PRIOR ART

Figure 1:
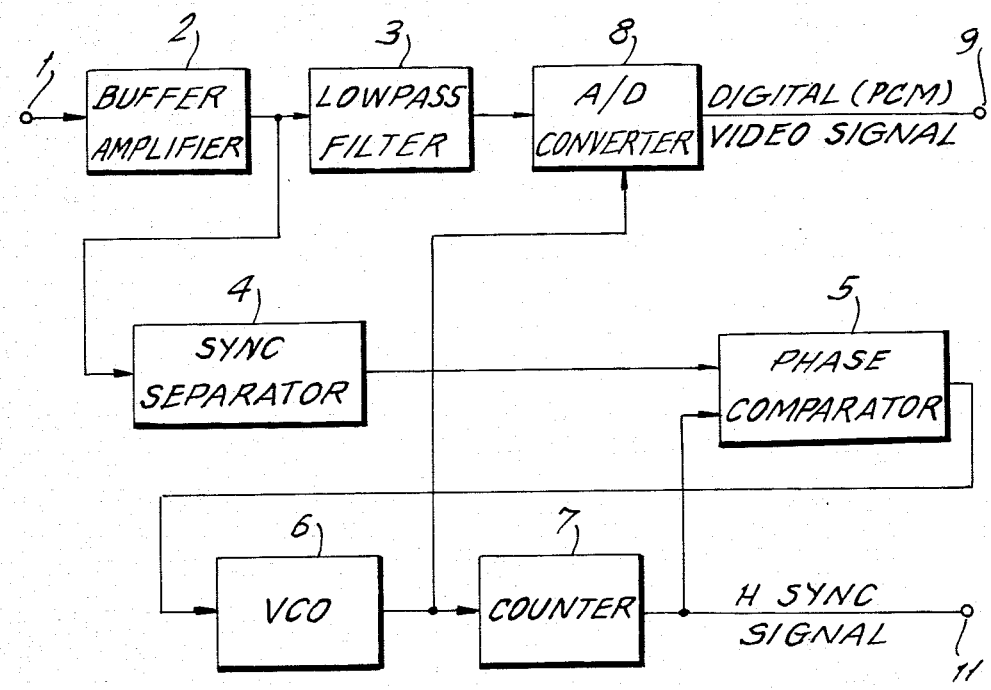
FIG. 1 is a block diagram showing a prior art A/D conversion circuit.

Referring to FIG. 1, a prior art A/D conversion circuit receives an input analog video signal at an input terminal 1. The video signal is passed through a buffer amplifier 2 having a low output impedance characteristic and then to a folded noise prevention lowpass filter 3 and to a synchronization signal separator 4. Synchronization signal separator 4 delivers an input horizontal synchronizing signal to supply it to one of inputs of a phase comparator 5. Voltage control oscillator (VCO) 6 generates a clock signal and a frequency-dividing counter 7 produces a horizontal synchronizing signal by dividing the clock signal received from VCO 6. The horizontal synchronizing signal is supplied to the other input of phase comparator 5. Phase comparator 5 outputs a feed body signal representing the phase difference between the input horizontal synchronizing signal and the produced horizontal synchronizing signal and supplied this feedback signal to the VCO 6 as a control signal. Therefore, the clock signal is synchronized with the input horizontal synchronizing signal.

The clock signal thus obtained is supplied to A/D converter 8 which convertes the input analog video signal delivered from the lowpass filter 3 into a digital (PCM) video signal. The digital video signal is supplied to an output terminal 9.

The present invention results from the discovery that if the clock signal of the prior art of FIG. 1 is used in a digital video processing system, a problem arises in that the phase of the synchronizing signal contained in the output digital video signal at the terminal 9 and the phase of the clock signal are not accurately synchronized to each other.

DESCRIPTION OF A PREFERRED EMBODIMENT

Figure 2:
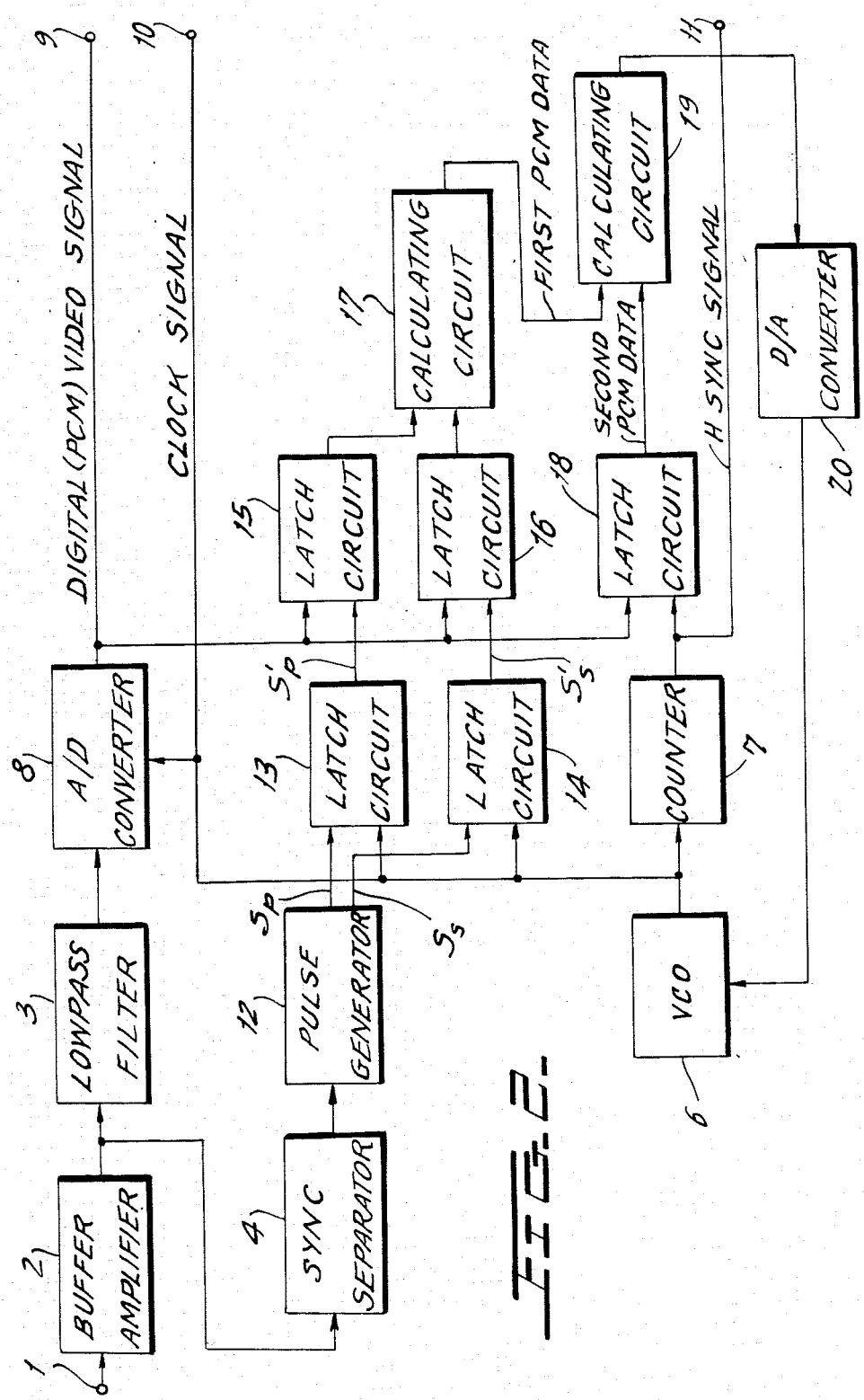
FIG. 2 is a block diagram showing one embodiment of the present invention.

FIG. 2 is a block diagram showing one embodiment of the present invention. As a note it is pointed out that the frequency of the clock signal in this embodiment is 13.5 MHz of the standard of the component system and is 858 times the frequency of the horizontal synchronizing signal. Theefore, a voltage control oscillator (VCO) 6 generates a clock signal of 13.5 MHz.

Figure 3:
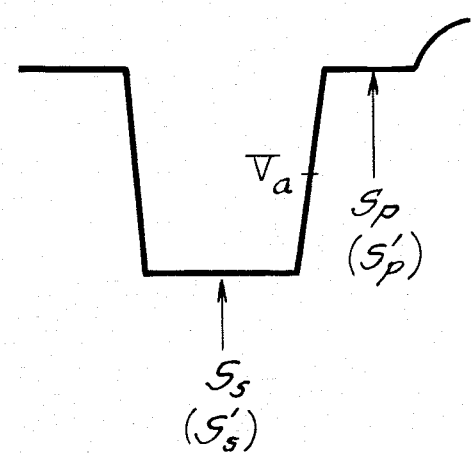
FIG. 3 depicts a signal suitable for explaining the operation of the embodiment of FIG. 2.

This embodiment employs buffer amplifier 2, lowpass filter 3, synchronizing signal separator 4, voltage controlled oscillator (VCO) 6, frequency-dividing counter 7, A/D converter 8, and output terminal 9 which identically correspond to the similarly numbered elements of FIG. 1. The embodiment further comprises a pulse generator 12 which generates a pedestal sample pulse $S_p$ and a sync tip sample pulse $S_s$ based on a horizontal synchronization pulse delivered from synchronizing signal separator 4. In the embodiment, this horizontal synchronizing pulse from separator 4 is referred to as a first horizontal synchronizing signal. FIG. 3 shows the timings of the pedestal sample pulse $S_p$ and the sync tip sample pulse $S_s$ with the horizontal synchronizing signal. Both pedestal sample pulse $S_p$ and the sync tip sample pulse $S_s$ are latched by latch circuits 13 and 14, respectively, in response to clock signal from the VCO 6 in order to accurately synchronize them to the clock signal. Therefore, latch circuits 13 and 14 generates a synchronized pedestal sample pulse $S_p'$ and a synchronized sync tip sample pulse $S_s'$. Other latch circuits 15 and 16 latch the digital PCM video signal delivered from the A/D converter 8 in response to the synchronized pedestal sample pulse $S_p'$ and the synchronized sync tip sample pulse $S_s'$, respectively. As result, latch circuits 15 and 16 hold pedestal data corresponding to the pedestal level and sync tip data corresponding to the sync tip level, respectively. A calculating circuit 17 produces the average of the pedestal data and the sync tip data. Therefore, this average corresponds to the intermediate level $V_a$ between the pedestal level and the sync tip level as shown in FIG. 3 and is referred to as first PCM data.

Frequency dividing counter 7 generates a second horizontal synchronizing signal by frequency-dividing the clock signal from the VCO 6 by 858. Another latch circuit 18 latches the digital PCM video signal from A/D converter 8 in response to the timing of the edge of the second horizontal synchronizing signal to hold second PCM data. In the embodiment, the first PCM data is respective of an ideal value at the edge of a horizontal synchronizing signal or, in the other words, target data to which the second PCM data should be equal to when the clock signal is synchronized with the horizontal synchronizing signal contained in the PCM video signal. A calculating circuit 19 calculates the difference data between the first PCM data and the second PCM data. The difference data are supplied through a D/A converter 20 the VCO 6 as a control signal. Thus, the VCO 6 is controlled to generate the clock signal such that the difference data between the first PCM data and the second PCM data tends toward zero. Accordingly, the frequency of the clock signal generated by the VCO 6 is accurately 858 times horizontal synchronizing frequency and the second horizontal synchronizing signal produced by frequency-dividing counter 7 is completely coincident with the horizontal synchronizing signal contained in the PCM video signal.

As described above, the present invention provides an A/D conversion circuit which can produce a highly accurate and stable clock signal, free of any adverse effects generated by the drifts of the synchronizing signal separator and the noise prevention lowpass filter. This is provided by directly comparing the phase of the horizontal synchronizing signal in the digital video signal with the phase of the clock signal.

From another viewpoint, the circuit arrangement of the present invention can be regarded as a highly stable flywheel type synchronizing signal reproducing circuit in which the horizontal synchronizing signal is outputted from a terminal 11 (FIG. 2). Therefore, in an overall digital video system, the clock signal and the horizontal synchronizing signal can be commonly used for a plurality of video sources and hence the A/D conversion circuit can be produced more economically. Further, in addition to the horizontal synchronizing signal, other synchronizing signals such as a vertical synchronizing signal, a burst flag signal and a blanking signal which are fully synchronized to the digital video signal can be obtained based on the synchronized clock signal according to the present invention.

What is claimed is:

1. An analog-to-digital conversion circuit for converting an input analog video signal into a digital video signal, said circuit comprising:
    means for generating a clock signal having a frequency controlled in response to a control signal;
    means responsive to said clock signal for converting said input analog signal into said digital video signal;
    means for frequency-dividing said clock signal to produce a horizontal synchronizing signal;
    means for obtaining a first signal substantially representative of an intermediate value between a pedestal level and a horizontal synchronizing tip level of said digital video signal;
    means timed by and responsive to said horizontal synchronizing signal for sampling said digital video signal to deliver a second signal;
    means for determining a difference between said first and second signals and for producing said control signal based on said difference; and
    means for feeding back said control signal to said clock signal generating means.

2. An analog-to-digital conversion circuit for converting an input analog video signal into a digital video signal, comprising:
    means for separating a horizontal synchronizing signal from said input video signal;
    means for generating a clock signal having a frequency which is controlled in response to a control signal;
    means coupled to said clock signal for converting said input analog signal into said digital video signal;
    means for frequency-dividing said clock signal to produce a timing signal having a frequency which corresponds to a horizontal synchronizing frequency of said horizontal synchronizing signal;
    means responsive to said horizontal synchronizing signal for obtaining a pedestal level contained in said digital video signal;

means responsive to said horizontal synchronizing signal for obtaining a horizontal synchronizing tip level contained in said digital video signal;

means for producing an average of said pedestal level and said horizontal synchronizing tip level;

means responsive to said timing signal for sample-holding said digital video signal to deliver a sampled datum;

means for calculating a difference between said average and said sampled datum; and means for feeding back said difference to said clock signal generating means as said control signal.

3. An analog-to-digital conversion circuit as claimed in claim 1, wherein said first signal obtaining means includes:

means for separating a horizontal synchronizing pulse from said input analog video signal;

means responsive to said horizontal synchronizing pulse for producing a first pedestal sampling pulse, said first pedestal sampling pulse being located at a pedestal level period of said analog video signal;

means responsive to said horizontal synchronizing pulse for producing a first sync tip sampling pulse, said first sync tip sampling pulse being located at a horizontal synchronizing tip period of said analog video signal;

means for latching said first pedestal sampling pulse by and on the basis of the timing of said clock signal to deliver a second pedestal sampling pulse;

means for latching said first sync tip sampling pulse by and on the basis of the timing of said clock signal to deliver a second sync tip sampling pulse;

means for extracting the value of said digital video signal at said second pedestal sampling pulse to deliver a pedestal level value;

means for extracting the value of said digital video signal at said second sync tip sampling pulse to deliver a sync tip level value; and means for producing said first signal by calculating the average of said pedestal level value and said sync tip level value.

4. An analog-to-digital conversion apparatus as claimed in claim 3 further including means for outputting said horizontal synchronizing signal to an external point.

5. An analog-to-digital conversion circuit comprising:

(a) an analog-to-digital converter for converting an input analog video signal into a digital video signal, said analog-to-digital converter being responsive to a clock signal for synchronizing said digital video signal to the timing of said clock signal;

(b) a phase locked loop arrangement for generating said clock signal, said phase locked loop arrangement being operated in accordance with a synchronizing signal contained in said digital video signal and including:

(1) a frequency divider for frequency-dividing said clock signal to produce a horizontal synchronizing signal;

(2) a first extractor for extracting a first value of said digital video signal on the basis of the timing of said horizontal synchronizing signal;

(3) a second extractor for extracting a pedestal value contained in said digital video signal, said pedestal value corresponding to a pedestal level of said digital video signal;

(4) a third extractor for extracting a sync tip value contained in said digital video signal, said sync tip value corresponding to a sync tip level of said digital video signal;

(5) a first calculator for calculating an intermediate value between said pedestal value and said sync tip value;

(6) a second calculator for calculating a difference value between said intermediate value and said first value; and (7) means responsive to said difference value for controlling the frequency of said clock signal.

6. An analog-to-digital conversion circuit for converting an input analog video signal into a digital video signal, said circuit comprising:

a sync separator for extracting from said input analog video signal an input horizontal synchronizing signal contained in said analog input video signal;

a pulse generator, responsive to said sync separator, for generating a first pulse during a pedestal interval of said analog video signal and a second pulse during a horizontal synchronizing tip interval of said analog video signal;

means for generating a clock signal;

pulse synchronizing means, responsive to said clock signal, for producing first and second clock-synchronized pulse signals, representing, respectively, said first and second pulses which have been synchronized to said clock signal;

an A/D converter, responsive to and synchronized to said clock signal for converting said input analog video signal to said digital video signal;

a divider for dividing said clock signal to produce a lower frequency horizontal sync signal; and sampling means, responsive to said first and second clock-synchronized pulse signals and to said horizontal sync signal, for sampling said digital video signal and for comparing the values of said digital video signal during activated states of said first and second clock-synchronized pulse signals with said horizontal sync signal and for producing, based on said comparison, said control signal for said clock signal generating means.

7. The circuit of claim 6, wherein said clock signal generating means comprises a voltage controlled oscillator.

8. The circuit of claim 6, wherein said sampling means comprises a plurality of latching circuits.

9. The circuit of claim 8, wherein said sampling means further comprises a digital-to-analog converter for converting said control signal from a digital to an analog form.

10. The circuit of claim 8, wherein said sampling means comprises a first latch for latching the value of said digital video signal during an activated state of said first clock-synchronized pulse signal, a second latch for latching the value of said digital video signal during an activated state of said second clock-synchronized pulse signal, means for calculating the average of said values latched in said first and second latches, a third latching circuit for latching the value of said digital video signal during an activated state of said lower frequency horizontal sync signal, and a further calculating circuit for calculating the difference between an output of said third latching circuit and said first calculating circuit and for producing based upon said difference said control signal.

* * * * *